(12) United States Patent
Kirtley et al.

(10) Patent No.: US 7,837,442 B2
(45) Date of Patent: Nov. 23, 2010

(54) ROOT SLEEVE FOR WIND TURBINE BLADE

(75) Inventors: Kevin R. Kirtley, Simpsonville, SC (US); Stefan Herr, Greenville, SC (US); William F. Heinze, Roswell, GA (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 12/327,456

(22) Filed: Dec. 3, 2008

(65) Prior Publication Data

US 2010/0135811 A1 Jun. 3, 2010

(51) Int. Cl.
*F03D 1/06* (2006.01)
*F03D 11/04* (2006.01)

(52) U.S. Cl. .................. 416/132 B; 416/210 R

(58) Field of Classification Search ........... 416/23, 416/132 B, 169 R, 174, 205, 210 A, 210 R, 416/211, 211 R, 212 R, 212, 212 RA
See application file for complete search history.

(56) References Cited

U.S. PATENT DOCUMENTS

| 2,478,252 | A | * | 8/1949 | Dean | 416/147 |
|---|---|---|---|---|---|
| 2,526,409 | A | * | 10/1950 | Price | 416/37 |
| 2,729,297 | A | * | 1/1956 | Felt | 416/239 |
| 4,323,331 | A | * | 4/1982 | Schachle et al. | 416/9 |
| 6,910,867 | B2 | | 6/2005 | Corten | |
| 7,004,724 | B2 | * | 2/2006 | Pierce et al. | 416/61 |
| 7,357,624 | B2 | | 4/2008 | Wobben | |
| 2006/0067827 | A1 | * | 3/2006 | Moroz | 416/204 R |
| 2007/0297909 | A1 | | 12/2007 | Wobben | |
| 2009/0148291 | A1 | * | 6/2009 | Gerber et al. | 416/147 |

FOREIGN PATENT DOCUMENTS

| EP | 1674723 A2 | 12/2005 |
|---|---|---|
| WO | 2004097215 A1 | 11/2004 |
| WO | 2005035978 A1 | 4/2005 |
| WO | 2007118581 A1 | 10/2007 |

* cited by examiner

*Primary Examiner*—Igor Kershteyn
(74) *Attorney, Agent, or Firm*—William F. Heinze; Ernest G. Cusick; Frank A. Landgraff

(57) ABSTRACT

A sleeve for a wind turbine blade includes an opening for receiving a root end of the wind turbine blade; and an inboard edge for substantially abutting a hub of a wind turbine.

18 Claims, 3 Drawing Sheets

ROOT SLEEVE FOR WIND TURBINE BLADE

BACKGROUND OF THE INVENTION

1. Technical Field

The subject matter described here generally relates to wind turbines, and, more particularly, to a root sleeve for a wind turbine blade.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a "spinner" or hub 9 to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that may receive input from an anemometer 18.

The blades 10 generate lift and capture momentum from moving air that is them imparted to the rotor as the blades spin in the "rotor plane." Each blade 10 is typically secured to the hub 9 at its "root" end, and then "spans" radially "outboard" to a free, "tip" end. The front, or "leading edge," of the blade 10 connects the forward-most points of the blade that first contact the air. The rear, or "trailing edge," of the blade 10 is where airflow that has been separated by the leading edge rejoins after passing over the suction and pressure surfaces of the blade. A "chord fine" connects the leading and trailing edges of the blade in the direction of the typical airflow across the blade. The length of the chord line is simply the "chord."

The thickness of a blade 10 varies across the planform, and the term "thickness" is typically used to describe the maximum distance between the low pressure suction surface and the high pressure surface on the opposite side of the blade for any particular chord line. The shape of the blade 10 when viewed perpendicular to the direction of flow, is called the "planform." "Angle of attack" is a term that is used in to describe the angle between the chord line of the blade 10 and the vector representing the relative motion between the blade and the air. "Pitching" refers to rotating the angle of attack of the entire blade 10 into or out of the wind in order to control the rotational speed and/or absorption of power from the wind. For example, pitching the blade 10 "towards feather" rotates of the leading edge of the blade into the wind, while pitching the blades "towards stall" rotates the leading edge of the blade out of the wind.

The root end of the blades 10 is often cylindrical in shape in order to facilitate connection of the blade to the hub 9. However, such cylindrical root configurations are not very effective at capturing momentum from the moving air.

BRIEF DESCRIPTION OF THE INVENTION

These and other drawbacks associated with such conventional approaches are addressed here in by providing, in various embodiments, a sleeve for a wind turbine blade including an opening for receiving a root end of the wind turbine blade; and an inboard edge for substantially abutting a hub of the wind turbine.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
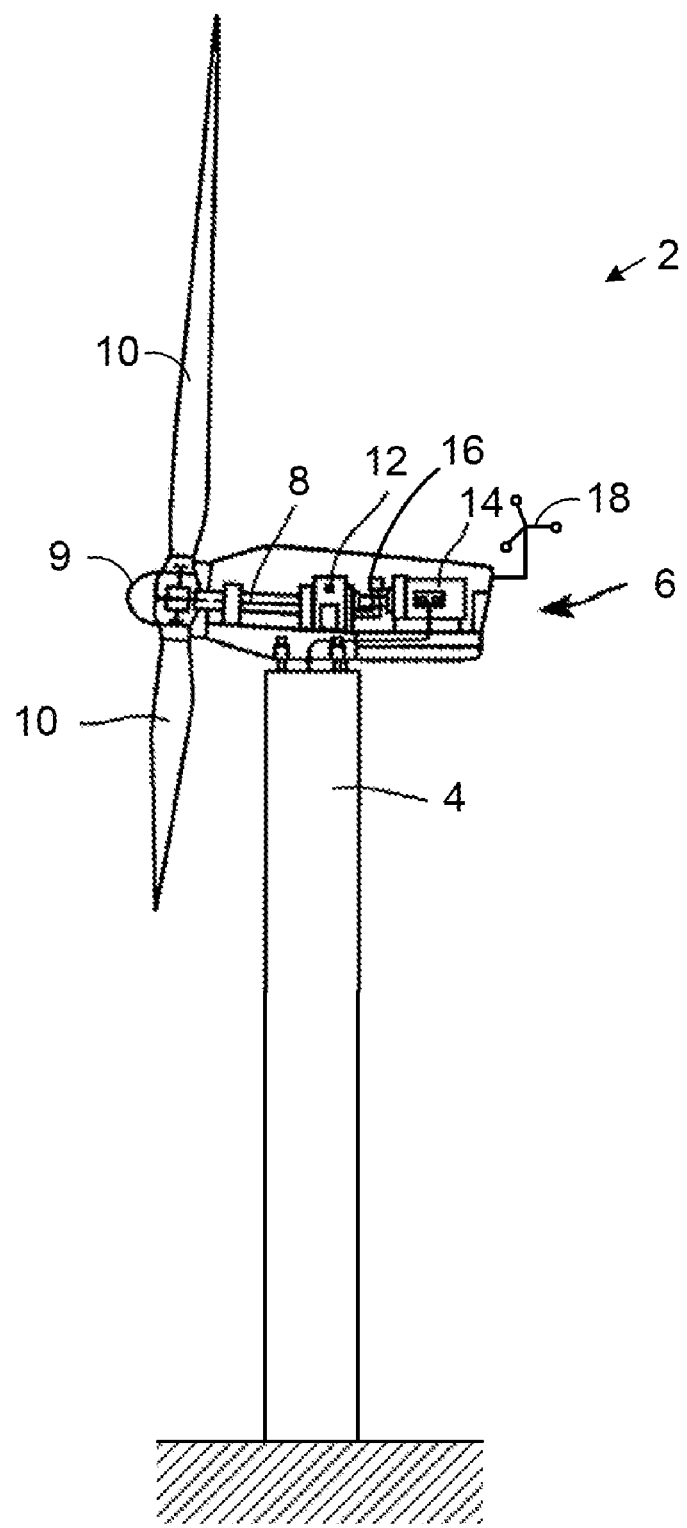
FIG. 1 is a schematic side view of a conventional wind generator.
Figure 2:
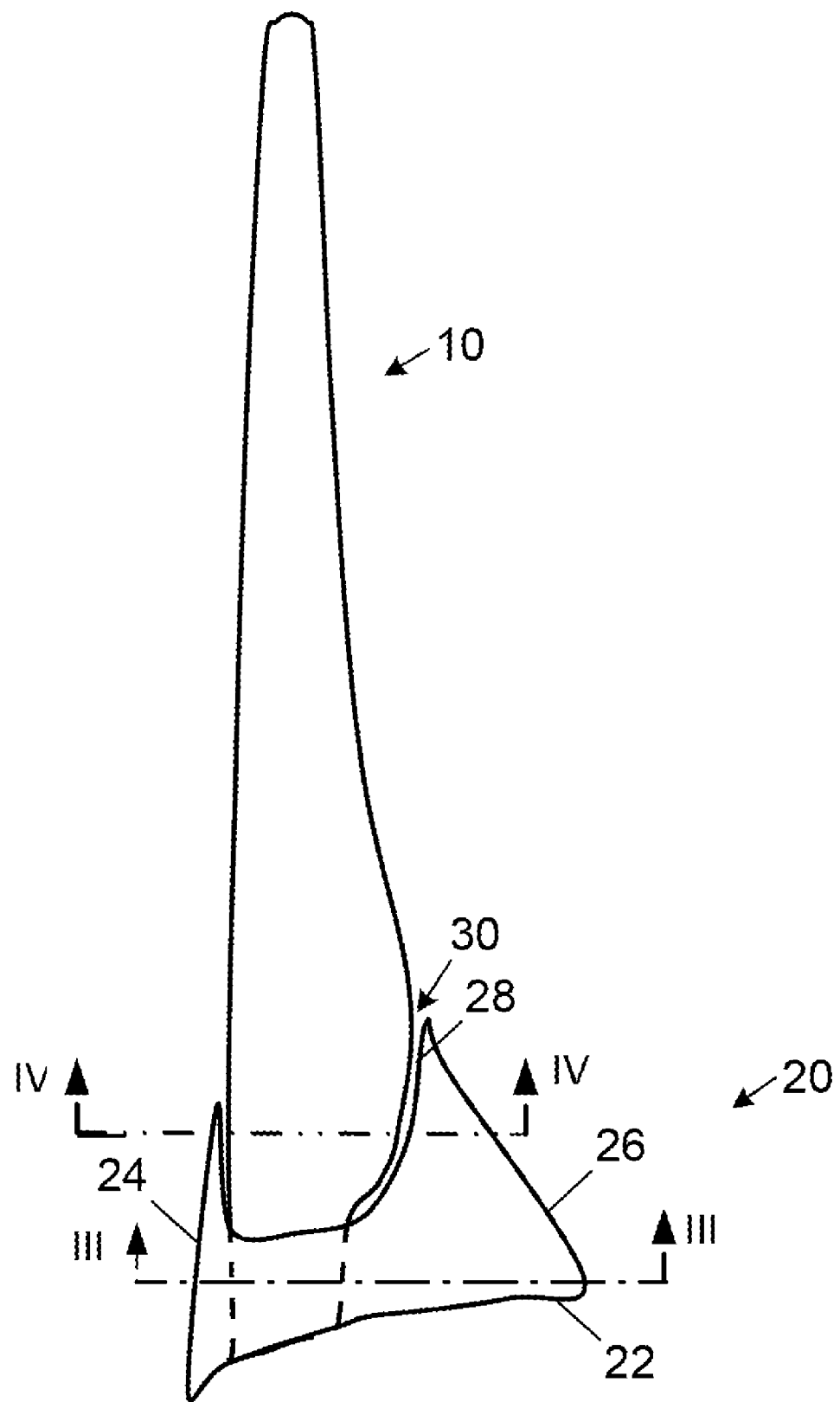
FIG. 2 is a planform view of a wind turbine blade and a root sleeve.

FIG. 2 is a planform view of the wind turbine blade 10 from FIG. 1 with a sleeve 20 arranged at the root end of the blade. However, the sleeve 10 may be used with any or all of the blades 10, with other types of wind turbines 2, and/or with other types of wind turbine blades 10 besides those shown in FIGS. 1 and 2.

The sleeve 20 includes an opening for receiving the root end of the wind turbine blade 10 shown by the hidden lines in FIG. 2. For example, the root end of the illustrated blade 10 is substantially cylindrical. During normal operation, the inboard edge 22 of the sleeve 20 is arranged at or near the hub 9 for substantially abutting the hub and/or for securing to the hub. In the illustrated example, the sleeve 20 extends spanwise out to the maximum chord of the blade 10 and maintains an airfoil shape that works cooperatively with the airfoil-shaped transition from circular root to maximum chord of the blade. However, other sleeve configurations may also be used including longer and shorter spanwise and/or chordwise configurations.

Figure 3:
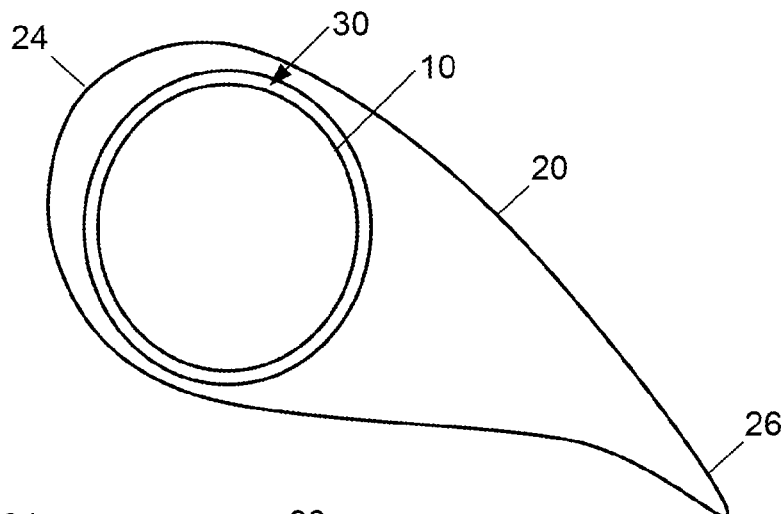
FIG. 3 is a cross-sectional view taken along section line III-III in FIG. 2.
Figure 4:
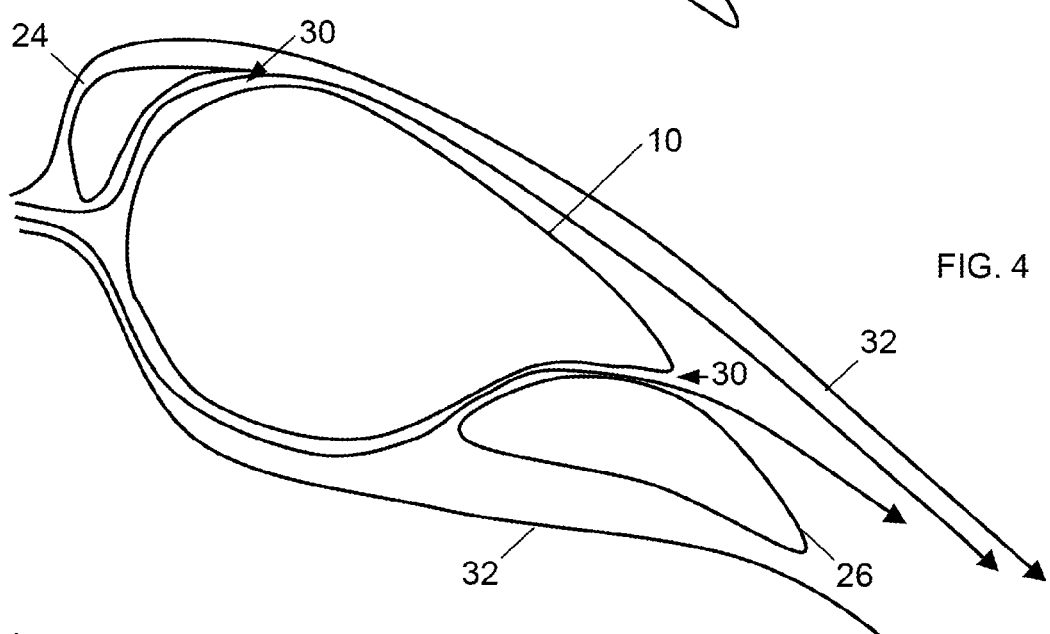
FIG. 4 is a cross-sectional view taken along section line IV-IV in FIG. 2.
Figure 5:
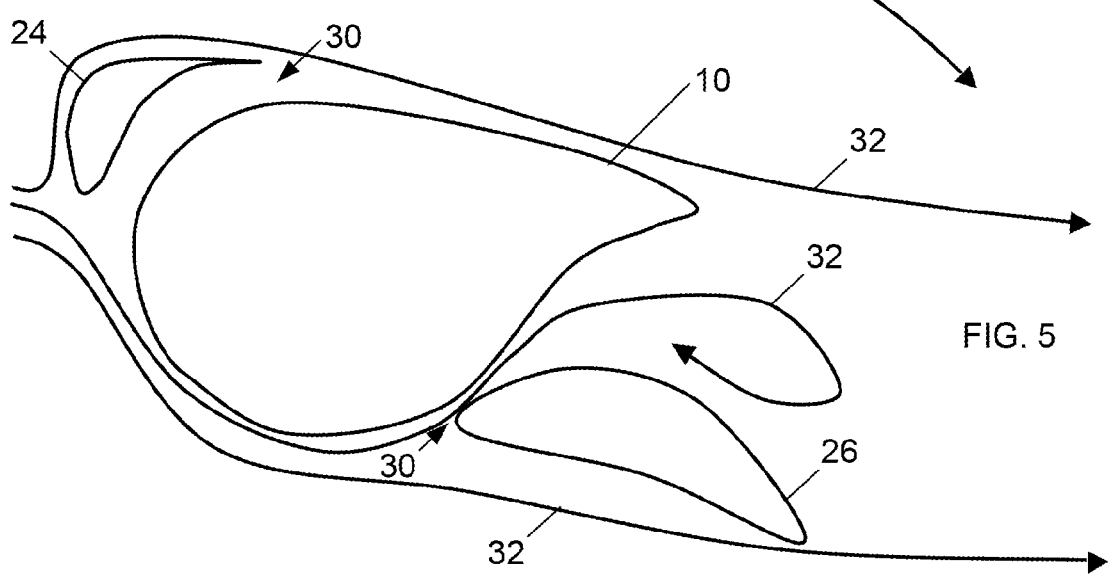
FIG. 5 is another cross-sectional view taken along section line IV-IV in FIG. 2.

As best illustrated in the cross-sectional views shown in FIGS. 3-5, the sleeve 20 has an airfoil shape including a rounded leading edge 24 and a sharp trailing edge 26. In the illustrated example, the sleeve 20 also has an inboard chord (at section fine III-III, for example) that is longer than an outboard chord (at section line IV-IV, for example). However, any other shape, including other airfoil shapes may also be used.

The outboard edge 28 of the sleeve 20 has a concave planform arranged on at least one of a suction side and a pressure side of the blade 10. In the illustrated example, the same concave planform is arranged on both of the pressure side and the suction side of the outboard edge 28. However, the planform may also be shaped differently on each side of the sleeve 20 and/or arranged on only one side of the sleeve.

As illustrated in FIGS. 4 and 5, the blade 10 is rotatable inside the sleeve 20 in order to accommodate the normal pitching of the blade 10. In these examples, the sleeve 20 does not rotate or otherwise pitch with the blade 10 and may be fixed to the hub 9. However, sleeve 20 may also be fixed to the blade 10, arranged to pitch with the blade 10, and/or to pitch independently of the blade.

A gap 30 is arranged between the blade 10 and the sleeve 20 for allowing airflow between the blade 10 and the outboard edge 28 of the sleeve as illustrated by the streamlines 32 in FIGS. 4 and 5. In the fine pitch rotational position of the blade 10 relative to the sleeve 20 shown in FIG. 4, the smooth streamlines illustrate a multi-element cross-sectional airfoil effect created in that configuration. In the feather pitch rotational position of the blade 10 shown in FIG. 5, the separated flow provides reduced lift. The illustrated multi-element airfoil configuration operates efficiently in fine pitch and inefficiently in feather pitch. The leading edge of the sleeve 20 can also be further extended and shaped to work cooperatively with these features while the trailing edge of the sleeve can also be extended for further chord extension and power extraction.

The technology disclosed here enables increased power extraction at the root of a wind turbine blade 10 with associated additional annual energy production. The invention will therefore yield increased annual energy production with the potential for decreased loads in a parked position. Increased power, capacity factor, reduced cost of electricity, and lower cut-in speeds are also available through optimized configurations. The technology is simple to manufacture, and can be optimized for various wind classes. It also maintains standard blade construction with a circular root for fixing to the pitch mechanism and a transition to the max chord point of the blade for ease in introduction. Furthermore, it allows a step change in geometry from the low aerodynamic efficiency cylinder shape to a more-effective airfoil shape.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A sleeve for a wind turbine blade, comprising
an opening at one end for receiving a root end of the wind turbine blade inside the sleeve;
an inboard edge for substantially abutting a hub of a wind turbine;
a substantially rounded leading edge and a substantially sharp trailing edge; and
an outboard edge having a concave planform arranged on at least one of a suction side and a pressure side of the blade.

2. The sleeve recited in claim 1, wherein the concave planform is arranged on the suction side of the blade.

3. The sleeve recited in claim 1, wherein the concave planform is arranged on the pressure side of the blade.

4. The sleeve recited in claim 1, wherein the concave planform is arranged on both of the pressure side and the suction side of the blade.

5. The sleeve recited in claim 1, wherein the sleeve further comprises an inboard chord that is longer than an outboard chord.

6. The sleeve recited in claim 1, wherein the inboard edge is for securing to the hub.

7. A wind turbine, comprising
a tower;
a nacelle arranged on the tower;
a gearbox connected to an electrical generator arranged in the nacelle;
a blade arranged on a hub for rotating the gearbox and driving the generator;
a sleeve for enclosing a portion of the blade, having a substantially rounded leading edge and a substantially sharp trailing edge, arranged at a root end of the blade substantially abutting the hub;
a gap that adjusts during pitching of the blade for changing air flow between the blade and the sleeve; and
wherein the blade is rotatable inside the sleeve.

8. The wind turbine recited in claim 7, wherein the sleeve extends spanwise along the blade to at least a position of a maximum chord of the blade.

9. The wind turbine recited in claim 7, wherein the sleeve comprises an outboard edge having a concave planform arranged on a suction side of the blade.

10. The wind turbine recited in claim 9, wherein the gap allows air flow between the blade and the outboard edge having a concave planform arranged on a suction side of the blade.

11. The wind turbine recited in claim 10, wherein the outboard edge of the sleeve further comprises a concave planform arranged on a pressure side of the blade.

12. The wind turbine recited in claim 11, wherein the gap allows air flow between the blade and the outboard edge having the concave planform arranged on the pressure side of the blade.

13. The wind turbine recited in claim 7, wherein an inboard chord of the sleeve is longer than an outboard chord of the sleeve.

14. The wind turbine recited in claim 10, wherein an inboard chord of the sleeve is longer than an outboard chord of the sleeve.

15. The wind turbine recited in claim 12, wherein an inboard chord of the sleeve is longer than an outboard chord of the sleeve.

16. The wind turbine recited in claim 7, wherein the sleeve is fixed relative to the hub.

17. The wind turbine recited in claim 7, wherein the sleeve rotates with the blade.

18. The wind turbine recited in claim 7, wherein the sleeve rotates independently of the blade.

* * * * *